Patented Oct. 5, 1937

2,095,093

UNITED STATES PATENT OFFICE 2,095,093

ADHESIVE AND PLASTIC MATERIAL AND METHOD OF MAKING THE SAME

Louis J. Fuhrmann, Peoria, Ill.

No Drawing. Application April 6, 1936,
Serial No. 72,984

6 Claims. (Cl. 260—4)

This invention pertains to the manufacture of both a phenol resin adhesive, and a plastic material.

More specifically the invention lies in a new product of manufacture derived from the treatment of discarded spent material of grain alcohol distillation.

Again, the invention lies in the method of manufacturing an adhesive material as well as a material which while in a plastic state can be formed or molded into various objects, such as insulators for electric use, and other articles of utility. Further, that such adhesive material, and the objects made from the yet plastic material, will be insoluble in hot or cold water, and insoluble in alcohol, organic or inorganic acids, or alkalies, also infusible, practically unbreakable, as well as vermin and termite proof.

The material I have found to be eminently suitable for use in production of the adhesive and object-material is thin, spent slop remaining after the distillation of alcohol from grains, particularly because of the carbohydrates and protein therein contained.

Otherwise stated, the material is the thin spent slop as the residue of distillery slop after all coarse grain suitable as a cattle feed has been separated therefrom, this thin spent slop being usually discharged in great volume into rivers and streams throughout the country as having no value.

But although this slop has not been heretofore found to be of value I have determined that it is in fact quite valuable for my purpose due to its protein content and the fact that since ordinarily it is waste material its use is attended with great economy, the same consisting of about 2.5 percent solids when evaporated under vacuum, for example, forming a syrup approximating thirty (30) Baumé, the chemical analysis of which is about as follows:

| | Per cent |
|---|---|
| Protein | 12.67 |
| Fat | 2.1 |
| Fiber | 2.74 |
| Ash | 1.51 |
| Nitrogen free extract | 13.25 |
| Water | 67.73 |

This material in its more or less concentrated form just described is treated with an alkali such as sodium hydroxide, potassium hydroxide, or barium hydroxide, or with any other alkaline chemical that may be less expensive, sufficient of the alkali being employed to dissolve all of the colloidal content of any given bulk. After all of such colloidal matter is thus dissolved, which requires from 18 to 24 hours, I add about 60 parts of 75% commercial phenol, together with substantially 40% commercial formaldehyde, thoroughly mixing the created bulk. However, instead of using phenol I may employ cresol as the treatment material, together with the formaldehyde.

Following the named treatment the material is placed in a converting vessel, connected with a return condenser for preventing loss of solvents, heat being applied to boil the material until it becomes a heavy viscous and homogeneous whole, this treatment requiring about one hour, whereupon in that form it is ready to be used as an excellent adhesive, or if desired the material may be placed in suitable molds for creating various articles of use or ornament, being then allowed to dry in the air, or, it may be hastened in drying, if desired, by the application of heat. The product is a hard unbreakable substance; it is an excellent dielectric, insoluble in water, acids, alkalies or alcohol, and furthermore since vermin and termite proof it may be used while in more or less viscous form for coating or partially impregnating such building materials as may be exposed to attack by such pests. And, in being infusible building materials thus treated are protected somewhat against the hazards.

Used as an adhesive it is adaptable for the plywood industry being an exceedingly desirable article for that purpose, as well as in kindred arts.

Not alone does the distillery waste provide an exceedingly cheap substance but it contains carbohydrates which consist primarily of starch dextrines, malto dextrine, and maltose sugar and in my present process these and the protein are converted into a resinoid product by the alkaline treatment, or hydrolyzing, this being assisted by the type of carbohydrates in the treated mass thereby making for a most excellent final product for the purposes named, beside being a better product than heretofore known by reason of the presence of the named carbohydrates in the material treated.

As an idea of the proportions of the several ingredients entering into my process the following is an example:—

To 100 parts of the concentrated syrup of the waste slop is added 10 parts of a 20% alkali solution followed by the named 18 to 24 hour conversion period. Finally is added 60 parts of the phenol or cresol and 50 parts of the formaldehyde, the whole being then treated by boiling as already outlined.

I claim:

1. An adhesive, and a plastic material capable of hardening through drying, resulting from treating substantially 100 parts concentrated distillery slop from which coarse and fibrous materials have been removed when hydrolyzed for a period of from 18 to 24 hours by the addition thereto of substantially 10 parts of a 20 per cent alkali solution to dissolve the colloidal matter therein, followed by the addition to the mixture of substantially 60 parts of a 75 per cent solution of phenol and substantially 50 parts of a 40 per cent solution of formaldehyde and after the bulk has reached a viscous condition upon reduction of part of its moisture content.

2. An adhesive, and a plastic material capable of hardening through drying, resulting from treating substantially 100 parts of distillery grain slop concentrated to substantially 30° Baumé and from which coarse and fibrous materials have been removed, followed by hydrolyzing treatment for from 18 to 24 hours with substantially 10 parts of a 20 per cent alkali solution to dissolve the colloidal matter therein, and the addition thereafter of substantially 60 parts of a 75 per cent solution of phenol, or cresol, and substantially 50 parts of a 40 per cent solution of formaldehyde, and boiled to reduce the whole to a viscous condition.

3. An adhesive, and a plastic material capable of hardening through drying, resulting from treatment of substantially 100 parts of distillery grain slop concentrated to substantially 30° Baumé, and from which coarse and fibrous materials have been removed when hydrolyzed by treatment for from 18 to 24 hours with substantially 10 parts of a 20 per cent alkali solution, followed by adding thereto substantially 60 parts of a 75 per cent solution of phenol, or cresol, and substantially 50 parts of a 40 per cent solution of formaldehyde, and after the bulk has reached a viscous condition upon partial reduction of its moisture content.

4. The method of producing both an adhesive and a plastic material which includes removing the coarse and fibrous materials from waste distillery grain slop and evaporating the remainder to a syrup, hydrolyzing substantially 100 parts of the syrup for from 18 to 24 hours by mixing therewith substantially 10 parts of a 20 per cent solution of an alkali to dissolve the colloidal content and to convert the carbohydrates, mixing therewith substantially 60 parts of a 75 per cent solution of phenol and substantially 50 parts of a 40 per cent solution of formaldehyde, and boiling the same to a viscous condition.

5. The method of producing both an adhesive and a plastic material which includes removing the coarse and fibrous materials from waste distillery grain slop and evaporating the remainder to a syrup, hydrolyzing substantially 100 parts of the syrup for from 18 to 24 hours with substantially 10 parts of a 20 per cent solution of an alkali to dissolve the colloidal content and to convert the carbohydrates, mixing therewith substantially 60 parts of a 75 per cent solution of phenol and substantially 50 parts of a 40 per cent solution of formaldehyde, and allowing the mass to partially dry.

6. In a method of producing both an adhesive and a plastic material from grain slop of distilleries from which coarse and fibrous materials have been removed and the residue reduced to a syrup, the method which consists in hydrolyzing substantially 100 parts of the syrup for from 18 to 24 hours by the addition thereto of substantially 10 parts of a 20 per cent solution of an alkali to dissolve the colloidal content and to convert the carbohydrates, mixing with the bulk after the hydrolyzing period substantially 60 parts of a 75 per cent phenol solution and substantially 50 parts of a 40 per cent solution of formaldehyde, and reducing the volume by partial drying.

LOUIS J. FUHRMANN.